Figure 1:
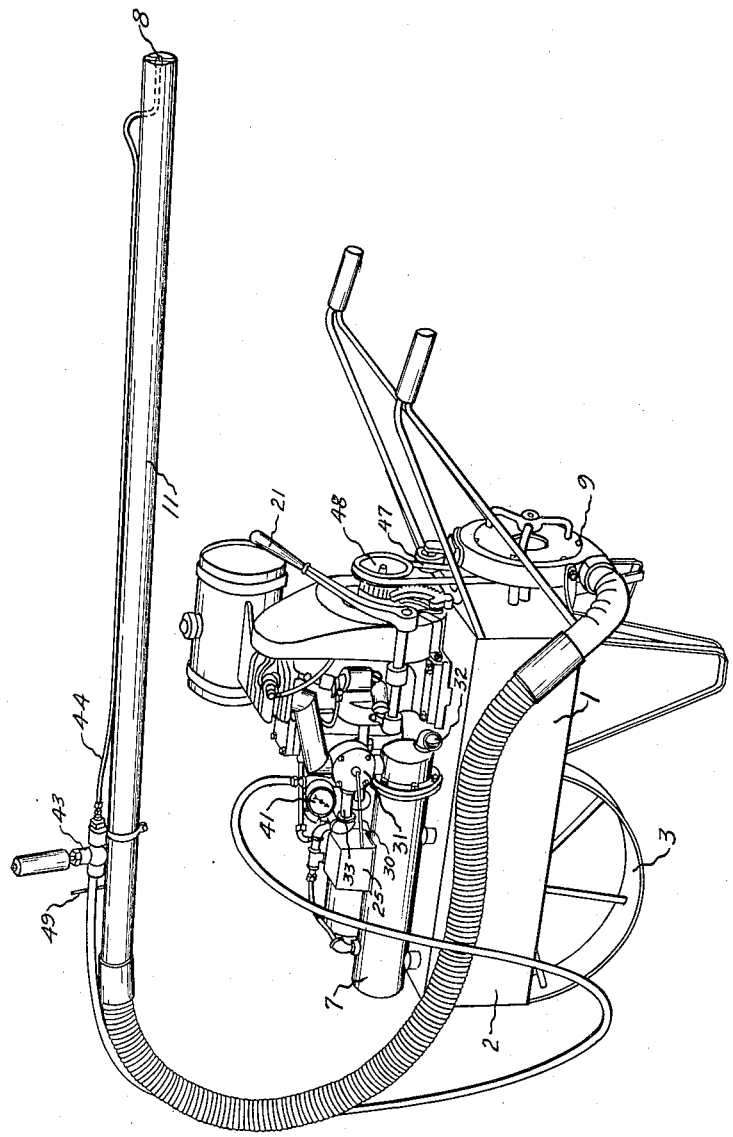

May 28, 1940.  J. A. ERICKSON  2,201,995
METHOD FOR SPRAYING INSECTICIDES
Original Filed Aug. 30, 1935    3 Sheets—Sheet 1

Inventor
John A. Erickson
By Beaman & Langford
Attorney

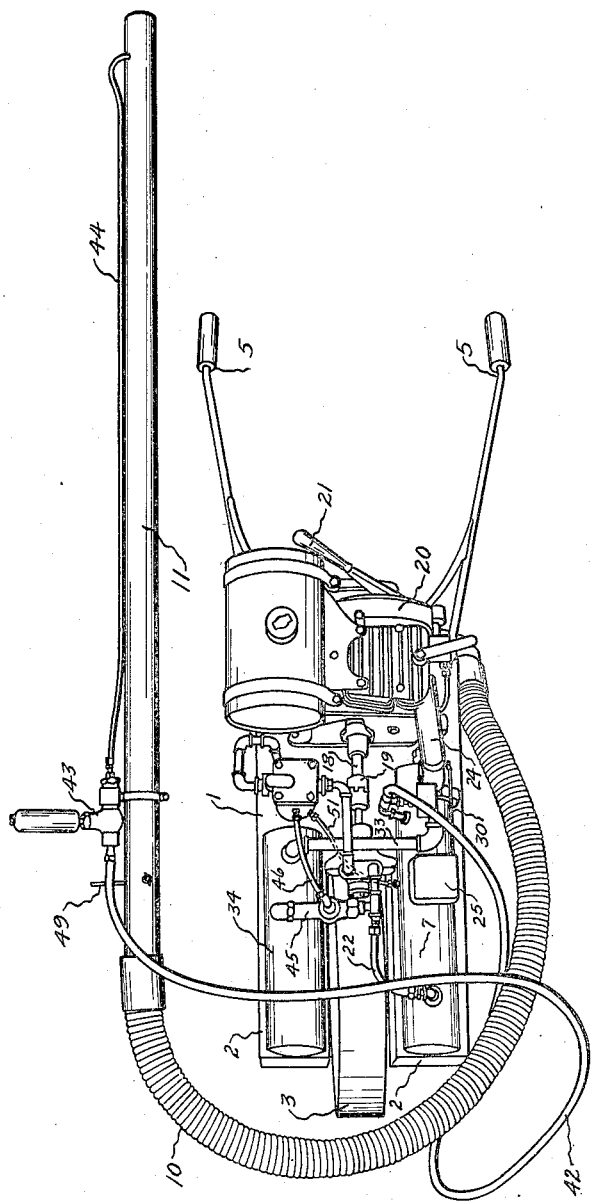

Patented May 28, 1940

2,201,995

UNITED STATES PATENT OFFICE 2,201,995

METHOD FOR SPRAYING INSECTICIDES

John A. Erickson, Jackson, Mich.

Application August 30, 1935, Serial No. 38,523
Renewed August 23, 1939

4 Claims. (Cl. 43—125)

This invention relates to a new method of exterminating insect pests on fruit trees, berry bushes, vegetables and all farm and garden crops, as well as deciduous trees and shrubs with non-poisonous insecticides and apparatus for carrying out the method.

In the past all successful spraying to kill insect pests, such as mites, leaf rollers, curculios, red bugs, chewing insects, mildew, berry moth, etc., has been done with aqueous mixtures containing poisons, such as arsenic, fluorine, copper sulphate, lead arsenite, nicotine, and a host of other poisons that are dangerous both to humans and animals, as well as being ineffectual on certain sap sucking insects who do not eat the poison deposited on the surface of the plants.

The use of these poisonous insecticides has become such a serious matter that the United States Department of Agriculture has placed specific limits on the residue of this poison which is permissible on fruits or vegetables for interstate shipment or export. Fruits and vegetables sold directly from the farmers' market to the consumer often contain excessive amounts of these poisons, which cause discomfort and injury to the persons eating them.

It so happens that some varieties of insect pests, principally those in the citrus fruit industry, have developed a resistance to many of the poisons used to exterminate them, resulting in a variety of insects which cannot be poisoned with any of the known insecticides. They are, however, easily killed by petroleum oils, if these oils can be applied directly to the skin of the insect.

Non-poisonous insecticides made from petroleum products and refined to a high unsulphonatable residue and used alone or mixed with some inert insecticide, such as pyrethrum or others, have been known and in use in a small way for some time, but so far no method or machine has been developed for successfully applying these inert and harmless insecticides. For some time past some small degree of success in the application of these insecticides has been accomplished by emulsifying the petroleum oil derivative with water and making a mixture containing ninety-seven percent water and three percent oil, and then applying this aqueous mixture to the plants to be sprayed.

The use of this oil emulsion has some very serious disadvantages in that when the oil is mixed with water it loses a large part of its killing property, because the petroleum oil derivative and inert insecticide depend for their killing power on skin contact with the insect, and not like the poisonous sprays, on the insect eating the poison. Many insects cover themselves with an oily or waxy material, which makes it impossible for the aqueous mixtures of insecticide, principally emulsified petroleum oils, to reach these insects, whereas the use of the petroleum oil without water mixtures will dissolve this waxy material and attack the skin of the insect. Another factor in the use of water mixtures is that if a light rain falls following an application of an emulsion spray, it washes off, thereby necessitating respraying.

The new process and machine, according to the present invention, eliminate the above difficulties and eliminate the necessity of carrying a large supply of water, making it possible to use a low cost, light weight machine, and inducing a considerable saving in the quantity of insecticide required.

According to the present invention, a straight petroleum product derivative similar to that which is now emulsified, together with an inert insecticide, such as pyrethrum, is heated to a predetermined and controlled temperature, is atomized into a fine fog or mist, and applied to a plant or tree by means of a strong blast of air.

An object, therefore, is to provide a method of treating trees wherein a liquid insecticide is atomized and sprayed on the trees, plants, or the like by a stream of air under pressure.

Another object of the invention is to provide a method for treating trees, plants, or the like wherein a petroleum product derivative including or not, as desired, an additional insecticide, is heated, atomized and spread on the trees, plants, or the like by a stream of air under pressure.

A further object of the invention is to provide a machine for heating a liquid, atomizing it, and spreading it by means of a stream of air under pressure.

Figure 2:
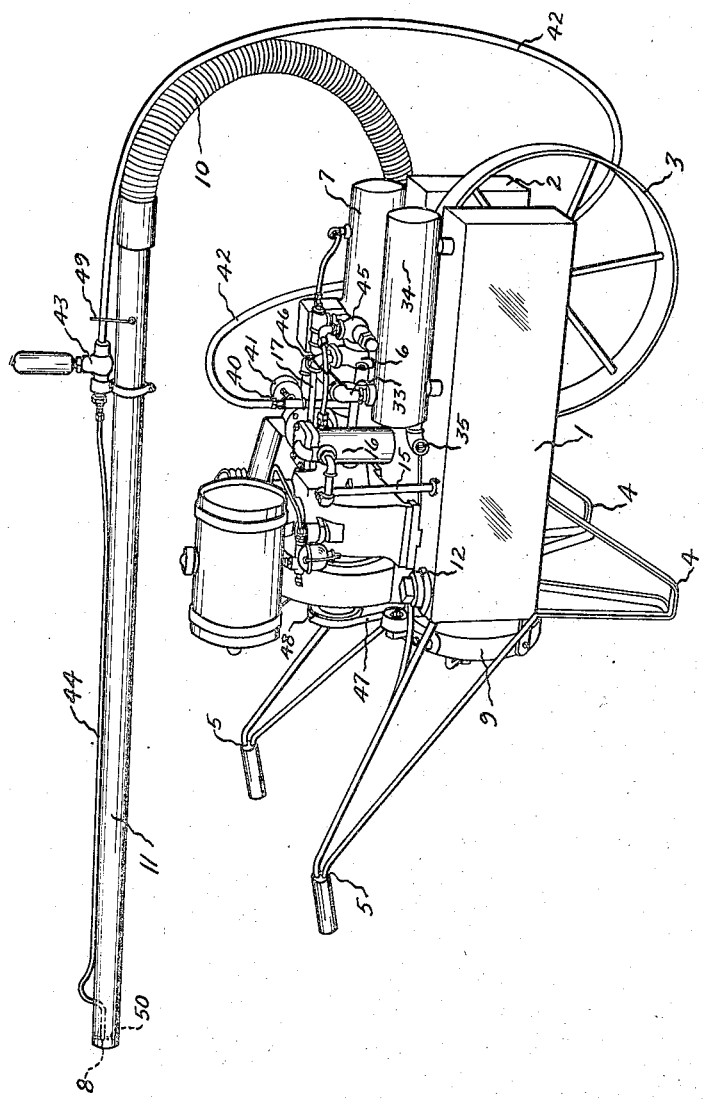

These and other objects will be apparent from the following specification when taken with the accompanying drawings, in which Fig. 1 is a perspective view showing one side of the machine according to the invention, Fig. 2 is a perspective view showing another side view of the machine according to the invention, and Fig. 3 is a perspective view showing the top thereof.

Referring particularly to the drawings, the reference character 1 indicates the base of the machine in the form of a tank for holding the spraying liquid. The tank 1 is bifurcated at the end 2 to receive the wheel 3. The opposite end of the tank is provided with legs 4 and handles 5 of a suitable design, the handles 5, the legs 4, and the wheel 3 being arranged so that the machine may be moved from place to place in the same manner as a wheel barrow.

The liquid to be sprayed stored in the tank 1 according to the present invention is a petroleum product derivative having added thereto, if the circumstances require, an inert insecticide such as pyrethrum. Briefly, the machine comprises a gear pump 6, a heating chamber 7, and a spraying nozzle 8, the spraying liquid being pumped by the pump 6 through the heating chamber 7 to the nozzle 8. At the nozzle 8 air under pressure from the blower 9 passing through the flexible hose 10 and the air conductor 11 picks up the liquid atomized by the nozzle 8 and spreads it on the trees, plants, shrubs, bushes, or whatever is being sprayed. The tank 1 is provided with a filling cap 12.

More specifically, spraying liquid is drawn from the tank 1 by the gear pump 6 through the pipe 15, the strainer 16 and the pipe 17. The gear pump 6 is operated through a shaft 18, and a coupling 19 from the gasoline engine 20, the engine 20 being of any suitable portable design and having a starting lever 21. Spraying liquid from the gear pump 6 is conducted by the pipe 22 to the heating chamber 7. The heating chamber 7 is heated by exhaust gases from the engine 20 conducted through the pipe 24. The temperature of the heating chamber 7 is regulated by the thermostat 25, which by the rod 30 regulates an exhaust by-pass control valve 31, particularly shown in Fig. 1. Exhaust gases, after passing through the spraying liquid heating chamber 7, are exhausted to the atmosphere through the vent 32. The operation of the exhaust control valve 31 is such that gases which are not passed through the heating chamber 7 are by-passed through the pipe 33 to the muffler 34, the muffler 34 having a vent 35 to the atmosphere. Heated oil under pressure is conducted from the heating chamber 7 through the pipe 40, having a pressure gauge 41 connected thereto, indicating the pressure of the heated oil, through the flexible hose 42 to a control valve 43 and through a tube 44 to the atomizing nozzle 8. The pressure of the oil being heated in the chamber 7 is regulated by a pressure regulating by-pass valve 45 connected in a pipe 46 connecting the pipe 22 from the pump 6 to the heating chamber 7, with the inlet side of the strainer 16. The automatic pressure regulating valve 45, after being set automatically, maintains a constant pressure in the chamber by by-passing that portion of the spraying liquid which is not atomized at the nozzle 8 to the strainer 16.

Air under pressure for spreading the atomized spraying liquid is provided by the blower 9 driven by the belt 47 passing over the sheave 48 driven by the motor 20. Air under pressure from the blower 9 passes through the flexible hose 10 to the air conductor 11. The flow of air under pressure through the air conductor is controlled by a butterfly valve having an operating handle 49. The atomizing nozzle 8 is connected with the tube 44, receiving spraying liquid under pressure from the chamber 7. The tube 44 is secured to the exterior of the air conductor 11, and adjacent the outlet thereof passes into the interior where it is connected to the atomizing nozzle 8 which is supported by the bridge 50 connected to the air conductor 11 near the mouth thereof so that air passing through the conductor 11 picks up and carries atomized spraying liquid from the nozzle 8.

Another features of the present machine is the by-pass tube 51, which provides a continuous communication between the heating chamber 7 and the strainer 16. The purpose of the by-pass 51 is to supply the strainer with a small stream of heated oil to facilitate the passage of the incoming cold oil therethrough, and it is more fully described in my copending application Ser. No. 6,803, filed February 16, 1935.

The oils used in the present invention are of the type which kill insects by skin contact, and which are especially refined to prevent the killing of vegetable life. It has been found that oils which are subjected to a sulphonation process during refining possess the necessary characteristics. Oils having an unsulphonatable residue after treatment of from 90 to 98 percent do not seriously injure growing plant life, but under certain conditions oil having a somewhat lower unsulphonated residue may be used without material harm resulting. I therefore do not wish to be limited in my invention by the range of unsulphonatable residue specifically given, but wish that range to be considered as illustrative only.

Oils for use as insecticides are divided into two general classes. There is one class of oils used for a dormant spray, that is, for spraying trees and low growing plants during the non-growing season. These oils are generally applied before the buds start to sprout in the spring for the purpose of killing eggs and minute insect life that harbor in the small bark crevices during the winter. A relatively heavy oil having a Saybolt viscosity of from 60 to 150 at 100° F. is preferred, and it is in this case that the less highly refined oils having a less unsulphonatable residue may be used. The other class of oils is used in the growing season and is relatively light, having a Saybolt viscosity varying from 30 to 60 at 100° F.

In operation, after the motor is started and the spraying liquid, which is the oil heretofore described with or without an additional insecticide, such as pyrethrum or some other insecticide soluble in oil, is heated to the desired temperature, which is from about 60° to 200° F., atomization of the oil is begun by opening the valve 43, and the atomized liquid is spread on the trees, plants, and the like by the stream of air under pressure from the blower 9 under the control of the valve in the air conductor 11, having a handle 49.

The oil is heated to fluidize the same sufficiently to allow it to be atomized into a mist. Consequently, the temperature to which the oil should be raised depends on its viscosity. In general, oil cannot be satisfactorily atomized if it has a Saybolt viscosity of higher than the neighborhood of 40 seconds. Accordingly, an oil temperature at which the Saybolt viscosity at least is in the neighborhood of 40 seconds should be maintained.

The extermination of insect pests by the spraying liquid according to this invention depends on the liquid coming into direct skin contact with the insects, and not like poisonous sprays which depend on the insect eating the poison. When it is necessary to highly dilute the killing agent, which is necessary in making an emulsion of a consistency so that it can be sprayed by heretofore known methods and machines, the possibility of the killing agent reaching the skin of the insect is far more remote than when it is directly applied in the form of an atomized spray according to the present invention. Thus, the present invention not only results in the elimination of heavy machinery for spraying large quantities of liquid and apparatus for hauling large quantities of liquid into the field, but also makes possible a much more effective killing of the insects, due to the concentration with which it is sprayed on them. The concentration with which the killing agent may be applied also results in a saving of the total amount of killing agent required.

The present invention also effects a saving in the eliminating of the step of emulsifying the oil insecticide with water.

When the oil according to the present invention comes into contact with the skin of the insect, it dissolves the water resisting materials with which many of the insects cover themselves, and thus the effectiveness of the oil insecticide is entirely utilized.

The compressed air, when used in connection with the atomized insecticide, performs several important functions. One of its functions is to act as a vehicle for carrying and directing the atomized insecticide to the desired zone. Another function of the air resides in the spraying zone being completely filled and saturated with a buoyant fog of the atomized insecticide, the insecticide being both forced and floated into contact with the under side of the leaves, thus being effective against insects which feed upon the under side of the leaves. In conventional spraying methods the insecticide is not effectively applied to that locality. It is conceivable, however, that in some cases, especially where high concentration of the insecticide is desired, air under pressure need not be employed in connection with the application of the atomized insecticide.

In lieu of mechanically atomizing the oil by a nozzle located in the air stream, the atomization of the oil may be obtained in other ways within the scope of the present invention. For example, the oil may be drawn into the air stream by a reduction in pressure in a well known manner and then atomized, in which case the air stream acts in the dual capacity of atomizing the oil and as a vehicle for the atomized oil.

While the machine according to this invention is particularly adaptable for spraying oil insecticides, its use is not so limited, and I do not, therefore, wish to be limited except by the scope of the following claims:

1. The process of treating growing trees, plants, or the like, for the control of insects, with oil of a viscosity too high to be sprayed in a fine mist at ordinary temperatures, which comprises heating the oil to fluidize the same sufficiently to allow atomizing, and spraying the thus heated oil in a finely atomized spray on the growing trees, plants, or the like.

2. The process of treating growing trees, plants, or the like, for the control of insects, with oil of a viscosity too high to be sprayed in a fine mist at ordinary temperatures, which comprises heating the oil to fluidize the same sufficiently to allow atomizing, providing a stream of air under pressure, and atomizing the oil in said stream so that the stream will carry the atomized oil onto the growing trees, plants, or the like, the emitting of said atomized oil and the application of said stream of air to said atomized oil taking place in a free atmosphere.

3. The process of treating growing trees, plants, or the like, for the control of insects, which comprises heating a mixture of an oil and an insecticide of a viscosity too high to be sprayed in a fine mist at ordinary temperatures to fluidize the mixture sufficiently to allow atomizing, and spraying the thus heated mixture in a finely atomized spray on the growing trees, plants, or the like.

4. The process of treating growing trees, plants or the like, for the control of insects, which comprises heating a mixture of oil and an insecticide, of a viscosity too high to be sprayed in a fine mist at ordinary temperatures, to fluidize the mixture sufficiently to allow atomizing, providing a stream of air under pressure, and atomizing the mixture in said stream so that the stream will carry the atomized mixture onto the growing trees, plants or the like, the emitting of said atomized mixture and the application of said stream of air to said atomized mixture taking place in a free atmosphere.

JOHN A. ERICKSON.